United States Patent
Wen

(10) Patent No.: US 9,734,564 B2
(45) Date of Patent: Aug. 15, 2017

(54) IMAGE CONTRAST ENHANCEMENT METHOD

(71) Applicant: Shenzhen China Star Optoelectronics Technology Co., Ltd., Shenzhen (CN)

(72) Inventor: Yichien Wen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 100 days.

(21) Appl. No.: 14/888,452

(22) PCT Filed: Oct. 26, 2015

(86) PCT No.: PCT/CN2015/092795
§ 371 (c)(1),
(2) Date: Nov. 2, 2015

(87) PCT Pub. No.: WO2017/049703
PCT Pub. Date: Mar. 30, 2017

(65) Prior Publication Data
US 2017/0169548 A1    Jun. 15, 2017

(30) Foreign Application Priority Data
Sep. 25, 2015    (CN) .......................... 2015 1 0623448

(51) Int. Cl.
*G06K 9/00*    (2006.01)
*G06K 9/36*    (2006.01)
(Continued)

(52) U.S. Cl.
CPC ............... *G06T 5/005* (2013.01); *G06T 5/00* (2013.01); *G06K 9/38* (2013.01);
(Continued)

(58) Field of Classification Search
CPC . G06T 5/005; G06T 5/00; G06K 9/38; H04N 1/403; H04N 1/4051; H04N 1/4105; H04N 1/4052
See application file for complete search history.

(56) References Cited

U.S. PATENT DOCUMENTS 8,649,629 B2 * 2/2014 Lim .................... H04N 1/4072
                                                            382/167
9,165,210 B1 * 10/2015 Srinivasan .............. G06T 5/008
(Continued)

*Primary Examiner* — Jonathan S Lee
(74) *Attorney, Agent, or Firm* — Leong C. Lei

(57) ABSTRACT

The present invention provides an image contrast enhancement method, which respectively calculates the absolute values of the differences of the gray scales between the pixels of two adjacent row of the same column and between the pixels of two adjacent column of the same row, and respectively calculates the first gray scale value weight and the second gray scale value weight according to the absolute values. Then, the cumulative calculation and the normalization process are performed according to the first, the second gray scale value weights. Ultimately, the enhancement gray scale table is obtained for redistributing the gray scale values of the respective pixels, which can raise the contrast of the image, reduce the distortion of the image and optimize the display result.

13 Claims, 7 Drawing Sheets

(51) Int. Cl.
*G06T 5/00* (2006.01)
*H04N 1/403* (2006.01)
*G06K 9/38* (2006.01)
*H04N 1/405* (2006.01)
*H04N 1/41* (2006.01)

(52) U.S. Cl.
CPC ............... *G06T 2207/10024* (2013.01); *G06T 2207/20172* (2013.01); *H04N 1/403* (2013.01); *H04N 1/4051* (2013.01); *H04N 1/4052* (2013.01); *H04N 1/4105* (2013.01)

(56) References Cited

U.S. PATENT DOCUMENTS

| | | | |
|---|---|---|---|
| 2009/0160880 A1* | 6/2009 | Park | G09G 3/3233 345/690 |
| 2010/0189349 A1* | 7/2010 | Miyasaki | G09G 3/2007 382/167 |
| 2016/0170702 A1* | 6/2016 | Jiang | G02F 1/133528 345/618 |

* cited by examiner

IMAGE CONTRAST ENHANCEMENT METHOD

FIELD OF THE INVENTION

The present invention relates to a display technology field, and more particularly to an image contrast enhancement method.

BACKGROUND OF THE INVENTION

The image enhancement technology is a kind of image process technology. It can significantly improve the image quality to make the image content with more senses of hierarchy, and the subjective watch result meets the demands of the people in advance. In real life, kinds of defects exist in the original image. For example, the aperture is small as shooting to result that the image is dark; the contrast of the scene is lower, and thus the point of the image is not unobtrusive; overexposure causes the image disorder and the white photo. With the image enhancement technology, the aforesaid issues can be effectively solved to promote the display quality.

The common image enhancement technology includes: saturation enhancement and contrast enhancement. Compared with the saturation enhancement, the contrast enhancement draws more attentions. The contrast enhancement is to adjust the gray scale distribution of the image, and to increase the distribution range of the image gray scale to raise the contrast of the whole or the portion of the image for improving the visual effect. The contrast enhancement can be categorized: Histogram Equalization and Gamma Correction. The Gamma Correction method uses the Gamma function to be the mapping function to raise the image contrast. As the method is applied for the enhancement of the contrast, it is very difficult to set a Gamma value suitable for every image, and when the wrong Gamma value is set, the original colors may change. The Histogram Equalization method is to compress the gray scale which the pixel number is less and expand the gray scale which the pixel number is more to obtain the image with higher contrast after process.

The Histogram Equalization method can comprise: Global Histogram Equalization (GHE) and Local Histogram Equalization (LHE). The Global Histogram Equalization is mainly to amend the histogram distribution of the image to achieve the objective of the contrast enhancement; and the Local Histogram Equalization is to predefine a local contrast, and then to enhance the local contrast to realize the effect of enhancing the image details.

FIG. 1 and FIG. 2 respectively show the histogram and display effect diagram of the original image. It can be observed that the contrast of the original image is very low, and display effect is bad.

Enhancing the contrast of the image with the Global Histogram Equalization method according to prior art generally comprises the following steps:

step 1, converting an image into a gray scale image, and the conversion formula is:

$$Gray(i,j)=((R(i,j)+G(i,j)+B(i,j))/3$$

wherein Gray(i,j) is a gray scale value of one pixel, and R(i,j), G(i,j) and B(i,j) respectively are gray scale values corresponding to the red sub pixel, the green sub pixel and the blue sub pixel of the pixel.

step 2, as shown in FIG. 3, counting the pixel amount corresponded with each gray scale value according to the gray scale value from 0 to 255, and making the histogram correspondingly;

step 3, as shown in FIG. 4, performing histogram cumulative calculation to the pixel amount corresponded with each gray scale value from 0 to 255, and the formula is:

$$C(X)=\Sigma_{j=0}^{225}H(j)$$

wherein, H(j) represents the pixel amount corresponding to the gray scale value j;

step 4, as shown in FIG. 5, performing normalization to the maximum of the cumulative histogram, and the formula is:

$$N(X)=\Sigma_{j=0}^{255}H(j)/C(255)$$

and then, multiplying the data after the normalization process by 255, to obtain:

$$out(x)=N(x)\times 255;$$

step 5, obtaining the corresponding new gray scale value by looking up table according to out(x).

FIG. 6 and FIG. 7 respectively are a histogram diagram and a display effect diagram of the image, in which the contrast is enhanced with the Global Histogram Equalization method according to prior art. It can be seen that the contrast of the image after the contrast enhancement gains a certain degree promotion. The display effect is improved but the contrast remains to be lower, and the display image has distortion.

SUMMARY OF THE INVENTION

An objective of the present invention is to provide an image contrast enhancement method, which can raise the contrast of the image, reduce the distortion of the image and optimize the display result.

For realizing the aforesaid objective, the present invention provides an image contrast enhancement method, comprising steps of:

step 1, providing an image comprising a plurality of pixels aligned in array, and converting the image into a gray scale image;

step 2, calculating an absolute value Q1 of a difference of gray scale values of pixels of two adjacent rows in each same column and a first gray scale value weight k1;

a formula of the absolute value Q1 of the difference of gray scale values of pixels of two adjacent rows in each same column is:

$$Q1=abs(Gray(i,j)-Gray(i+1,j))$$

a formula of the first gray scale value weight k1 is:

$$k1=\frac{\sqrt[n]{256}}{\sqrt[n]{Q1}}$$

wherein a value range of the absolute value Q1 of the difference of gray scale values of pixels of two adjacent rows in the same column is 0 to 255, and n is a positive integer larger than 1;

performing cumulative calculation according to the first gray scale value weight k1 and the gray scale values of pixels of two adjacent rows in each same column, and a formula is:

$$C1(X)=\Sigma_{a=Gray(i,j)}^{Gray(i+1,j)}k1H1(a)$$

wherein i, j are positive integers, which respectively represents a row number and a column number where the pixel is, and Gray(i,j) is a gray scale value of the pixel of ith row, jth column, and Gray(i+1,j) is a gray scale value of the pixel of i+1th row, jth column, and H1(a) is an amount of the pixels, of which gray scale values are a, and C1(X) is a sum amount of the pixels corresponded with respective gray scale values between Gray(i,j) and Gray(i+1,j);

step 3, calculating an absolute value Q2 of a difference of gray scale values of pixels of two adjacent columns in each same row and a second gray scale value weight k2;

a formula of the absolute value Q2 of the difference of gray scale values of pixels of two adjacent columns in each same row is:

$$Q2=\text{abs}(Gray(i,j)-Gray(i,j+1))$$

a formula of the second gray scale value weight is:

$$k2 = \frac{\sqrt[n]{256}}{\sqrt[n]{Q2}}$$

wherein a value range of the absolute value Q2 of the difference of gray scale values of pixels of two adjacent columns in the same row is 0 to 255, and n is a positive integer larger than 1 and is the same value in step 2;

performing cumulative calculation according to the second gray scale value weight k2 and the gray scale values of pixels of two adjacent columns in each same row, and a formula is:

$$C3(X)=\Sigma_{a=Gray(i,j)}^{Gray(i,j+1)}k2H3(a)$$

wherein i, j are positive integers, which respectively represents a row number and a column number where the pixel is, and Gray(i,j) is a gray scale value of the pixel of ith row, jth column, and Gray(i,j+1) is a gray scale value of the pixel of ith row, j+1th column, and H3(a) is an amount of the pixels, of which gray scale values are a, and C3(X) is a sum amount of the pixels corresponded with respective gray scale values between Gray(i,j) and Gray(i,j+1);

step 4, adding the C1(X) in the step 2 and the C3(X) in the step 3 to obtain C(X);

$$C(X)=C1(X)+C3(X)$$

step 5, maximum normalization, and a formula is:

$$N(X)=(\Sigma_{a=0}^{255}C(a))/C(255)$$

and multiplying N(X) by 255 to obtain an enhancement gray scale table out(X) with calculation, and looking up the table to obtain a new output gray scale value out_gray(i,j).

The each pixel comprises: a red sub pixel, a green sub pixel and a blue sub pixel.

A conversion formula of converting the image to the gray scale image is:

$$Gray(i,j)=(R(i,j)+G(i,j)+B(i,j))/3$$

wherein R(i,j), G(i,j) and B(i,j) respectively are gray scale values corresponding to the red sub pixel, the green sub pixel and the blue sub pixel of the pixel of ith row, jth column.

X is a positive integer between 0 and 255.

The first gray scale value weight k1 and the second gray scale value weight k2 are the same or different.

The image in the step 1 is an image shown by a flat display apparatus.

n in the step 2 and the step 3 is 2, 3 or 4.

The first gray scale value weight k1 is inversely proportional to n root mean square of the absolute value Q1 of the difference of gray scale values of pixels of two adjacent rows in the same column, and the second gray scale value weight k2 is inversely proportional to n root mean square of the absolute value Q2 of the difference of gray scale values of pixels of two adjacent columns in the same row.

The present invention further provides an image contrast enhancement method, comprising steps of:

step 1, providing an image comprising a plurality of pixels aligned in array, and converting the image into a gray scale image;

step 2, calculating an absolute value Q1 of a difference of gray scale values of pixels of two adjacent rows in each same column and a first gray scale value weight k1;

a formula of the absolute value Q1 of the difference of gray scale values of pixels of two adjacent rows in each same column is:

$$Q1=\text{abs}(Gray(i,j)-Gray(i+1,j))$$

a formula of the first gray scale value weight k1 is:

$$k1 = \frac{\sqrt[n]{256}}{\sqrt[n]{Q1}}$$

wherein a value range of the absolute value Q1 of the difference of gray scale values of pixels of two adjacent rows in the same column is 0 to 255, and n is a positive integer larger than 1;

performing cumulative calculation according to the first gray scale value weight k1 and the gray scale values of pixels of two adjacent rows in each same column, and a formula is:

$$C1(X)=\Sigma_{a=Gray(i,j)}^{Gray(i+1,j)}k1H1(a)$$

wherein i, j are positive integers, which respectively represents a row number and a column number where the pixel is, and Gray(i,j) is a gray scale value of the pixel of ith row, jth column, and Gray(i+1,j) is a gray scale value of the pixel of i+1th row, jth column, and H1(a) is an amount of the pixels, of which gray scale values are a, and C1(X) is a sum amount of the pixels corresponded with respective gray scale values between Gray(i,j) and Gray(i+1,j);

step 3, calculating an absolute value Q2 of a difference of gray scale values of pixels of two adjacent columns in each same row and a second gray scale value weight k2;

a formula of the absolute value Q2 of the difference of gray scale values of pixels of two adjacent columns in each same row is:

$$Q2=\text{abs}(Gray(i,j)-Gray(i,j+1))$$

a formula of the second gray scale value weight k2 is:

$$k2 = \frac{\sqrt[n]{256}}{\sqrt[n]{Q2}}$$

wherein a value range of the absolute value Q2 of the difference of gray scale values of pixels of two adjacent columns in the same row is 0 to 255, and n is a positive integer larger than 1 and is the same value in step 2;

performing cumulative calculation according to the second gray scale value weight k2 and the gray scale values of pixels of two adjacent columns in each same row, and a formula is:

$$C3(X)=\Sigma_{a=Gray(i,j)}^{Gray(i,j+1)} k2 H3(a)$$

wherein i, j are positive integers, which respectively represents a row number and a column number where the pixel is, and Gray(i,j) is a gray scale value of the pixel of ith row, jth column, and Gray(i,j+1) is a gray scale value of the pixel of ith row, j+1th column, and H3(a) is an amount of the pixels, of which gray scale values are a, and C3(X) is a sum amount of the pixels corresponded with respective gray scale values between Gray(i,j) and Gray(i,j+1);

step 4, adding the C1(X) in the step 2 and the C3(X) in the step 3 to obtain C(X);

$$C(X)=C1(X)+C3(X)$$

step 5, maximum normalization, and a formula is:

$$N(X)=(\Sigma_{a=0}^{255} C(a))/C(255)$$

and multiplying N(X) by 255 to obtain an enhancement gray scale table out(X) with calculation, and looking up the table to obtain a new output gray scale value out_gray(i,j);

wherein the each pixel comprises: a red sub pixel, a green sub pixel and a blue sub pixel;

wherein the image in the step 1 is an image shown by a flat display apparatus;

wherein n in the step 2 and the step 3 is 2, 3 or 4;

The benefits of the present invention are: the image contrast enhancement method provided by the present invention respectively calculates the absolute values of the differences of the gray scales between the pixels of two adjacent row of the same column and between the pixels of two adjacent column of the same row, and respectively calculates the first gray scale value weight and the second gray scale value weight according to the absolute values. Then, the cumulative calculation and the normalization process are performed according to the first, the second gray scale value weights. Ultimately, the enhancement gray scale table is obtained for redistributing the gray scale values of the respective pixels, which can raise the contrast of the image, reduce the distortion of the image and optimize the display result.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
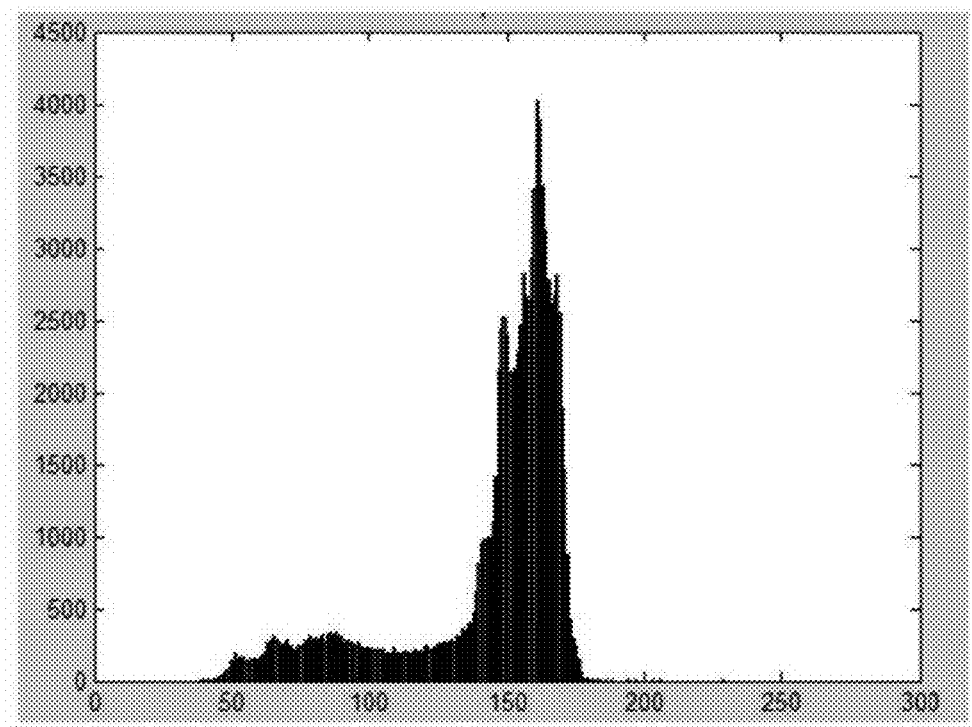
FIG. 1 is a histogram of an original image.
Figure 2:
FIG. 2 is a display effect diagram of the original image.
Figure 3:
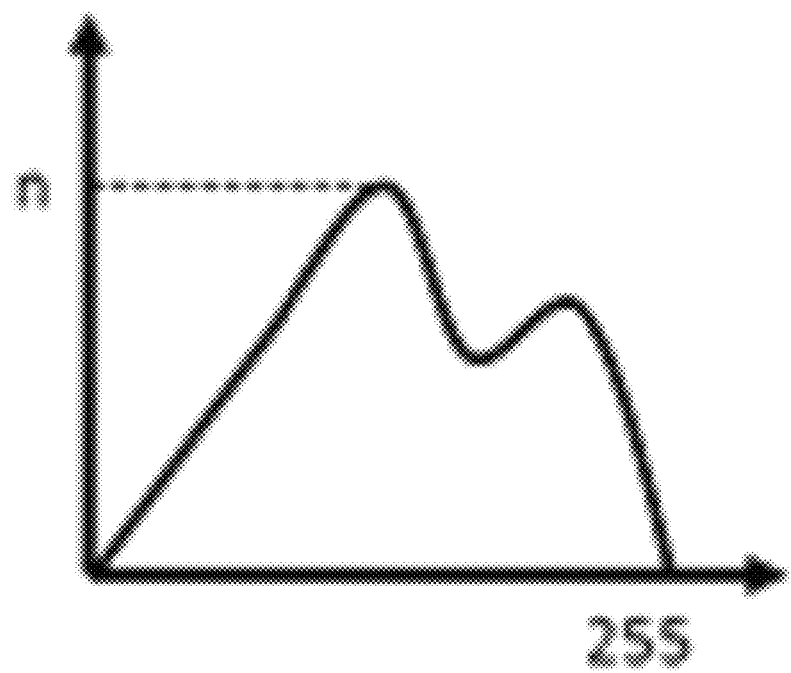
FIG. 3 is a diagram of the step 2 of enhancing the contrast of the image in the Global Histogram Equalization method according to prior art.
Figure 4:
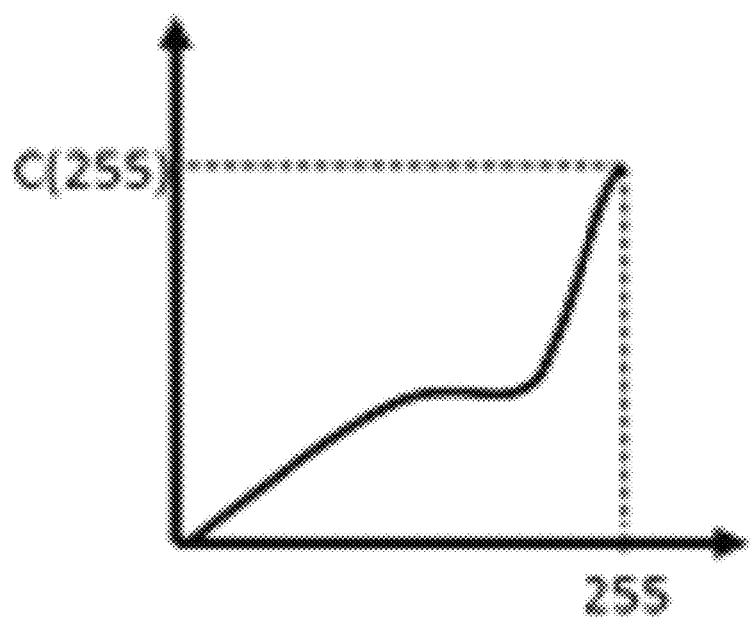
FIG. 4 is a diagram of the step 3 of enhancing the contrast of the image in the Global Histogram Equalization method according to prior art.
Figure 5:
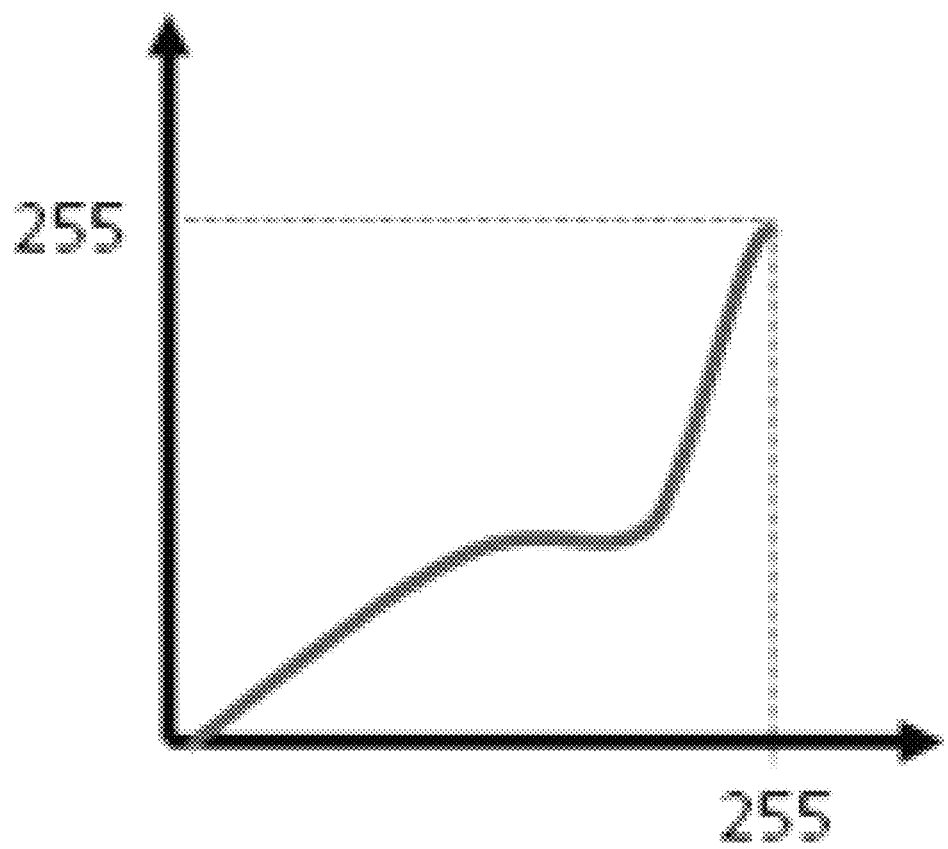
FIG. 5 is a diagram of the step 4 of enhancing the contrast of the image in the Global Histogram Equalization method according to prior art.
Figure 6:
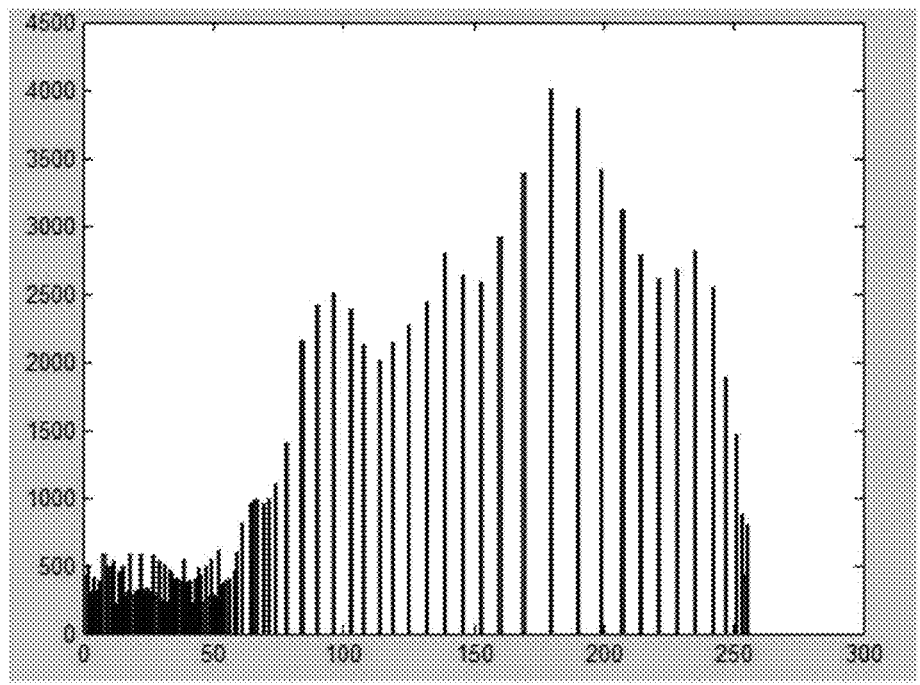
FIG. 6 is a histogram diagram of the image, in which the contrast is enhanced with the Global Histogram Equalization method according to prior art.
Figure 7:
FIG. 7 is a display effect diagram of the image, in which the contrast is enhanced with the Global Histogram Equalization method according to prior art.
Figure 8:
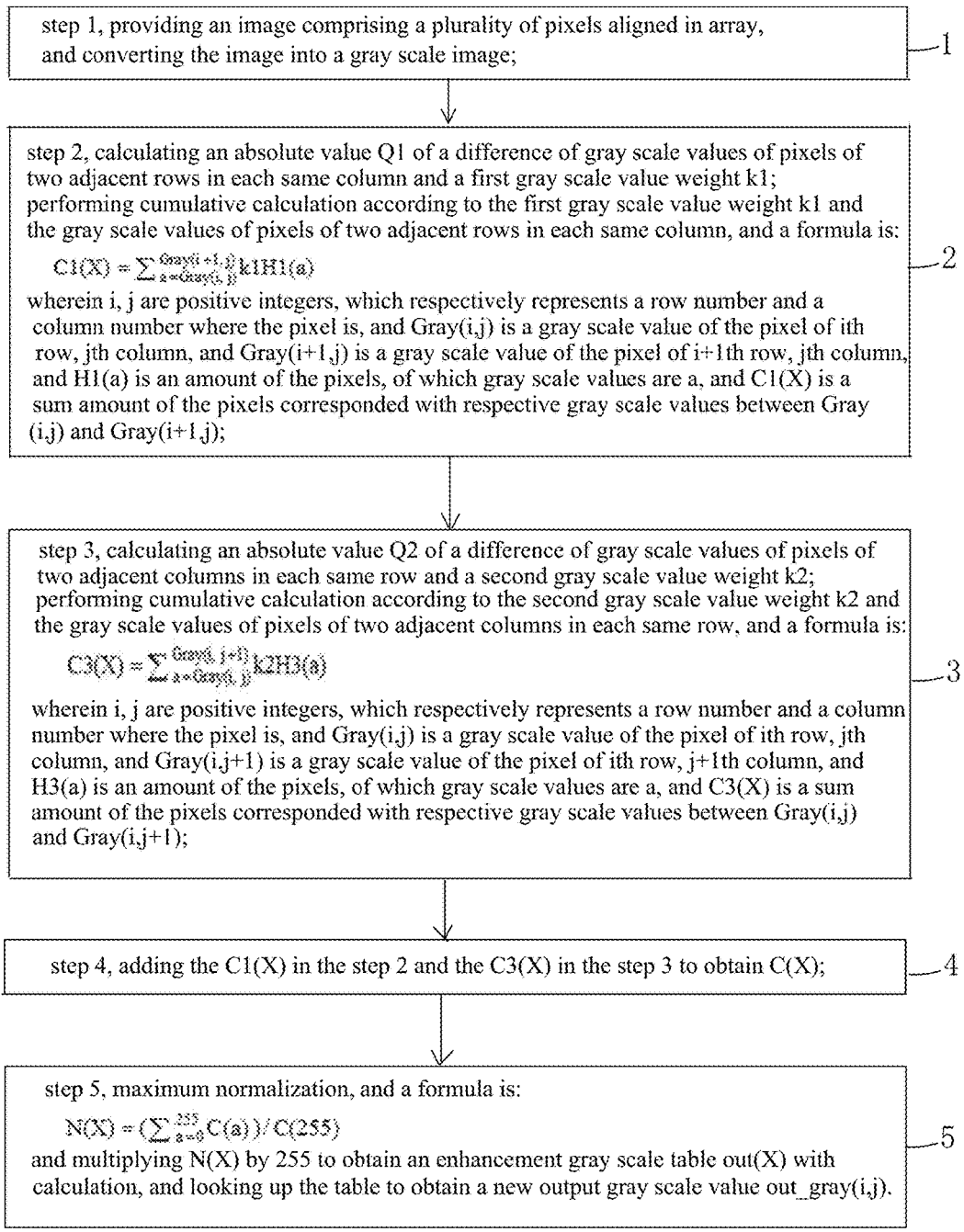
FIG. 8 is a flowchart of an image contrast enhancement method according to the present invention.

Please refer to FIG. 8. The present invention provides an image contrast enhancement method, comprising steps of:

step 1, providing an image comprising a plurality of pixels aligned in array, and converting the image into a gray scale image.

Specifically, the each pixel comprises: a red sub pixel, a green sub pixel and a blue sub pixel. A conversion formula of converting the image to the gray scale image is:

$$Gray(i,j)=((R(i,j)+G(i,j)+B(i,j))/3$$

wherein R(i,j), G(i,j) and B(i,j) respectively are gray scale values corresponding to the red sub pixel, the green sub pixel and the blue sub pixel of the pixel of ith row, jth column.

The image in the step 1 is an image shown by a flat display apparatus, such as a LCD, an OLED.

step 2, calculating an absolute value Q1 of a difference of gray scale values of pixels of two adjacent rows in each same column and a first gray scale value weight k1;

a formula of the absolute value Q1 of the difference of gray scale values of pixels of two adjacent rows in each same column is:

$$Q1=abs(Gray(i,j)-Gray(i+1,j))$$

a formula of the first gray scale value weight k1 is:

$$k1 = \frac{\sqrt[n]{256}}{\sqrt[n]{Q1}}$$

wherein a value range of the absolute value Q1 of the difference of gray scale values of pixels of two adjacent rows in the same column is 0 to 255, and n is a positive integer larger than 1, and furthermore, n is preferably to be 2, 3 or 4.

As known according to the formula of the first gray scale value weight k1, the first gray scale value weight k1 is inversely proportional to n root mean square of the absolute value Q1 of the difference of gray scale values of pixels of two adjacent rows in the same column.

performing cumulative calculation according to the first gray scale value weight k1 and the gray scale values of pixels of two adjacent rows in each same column, and a formula is:

$$C1(X) = \Sigma_{a=Gray(i,j)}^{Gray(i+1,j)} k1 H1(a)$$

wherein i, j are positive integers, which respectively represents a row number and a column number where the pixel is, and Gray(i,j) is a gray scale value of the pixel of ith row, jth column, and Gray(i+1,j) is a gray scale value of the pixel of i+1th row, jth column, and H1(a) is an amount of the pixels, of which gray scale values are a, and C1(X) is a sum amount of the pixels corresponded with respective gray scale values between Gray(i,j) and Gray(i+1,j); X is a positive integer between 0 and 255.

step 3, calculating an absolute value Q2 of a difference of gray scale values of pixels of two adjacent columns in each same row and a second gray scale value weight k2;

a formula of the absolute value Q2 of the difference of gray scale values of pixels of two adjacent columns in each same row is:

$$Q2 = abs(Gray(i,j) - Gray(i,j+1))$$

a formula of the second gray scale value weight k2 is:

$$k2 = \frac{\sqrt[n]{256}}{\sqrt[n]{Q2}}$$

wherein a value range of the absolute value Q2 of the difference of gray scale values of pixels of two adjacent columns in the same row is 0 to 255, and n is a positive integer larger than 1 and is the same value in step 2; furthermore, n is preferably to be 2, 3 or 4.

Figure 9:
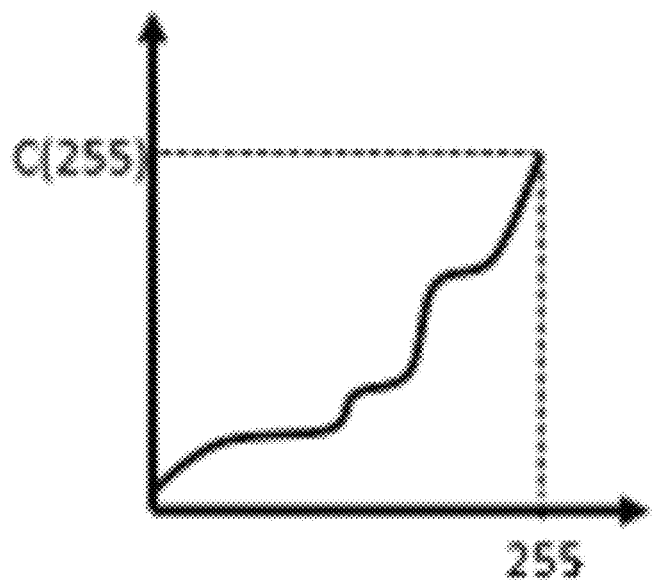
FIG. 9 is a diagram of the step 4 in the image contrast enhancement method according to the present invention.
Figure 10:
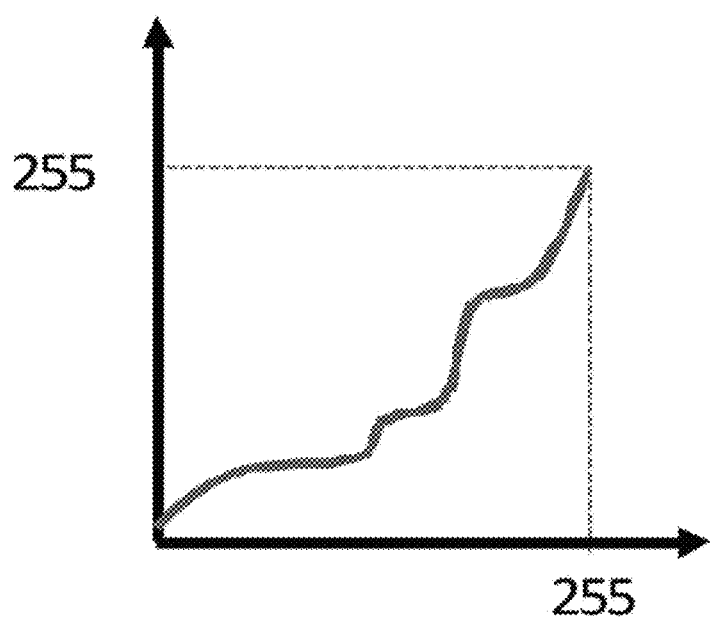
FIG. 10 is a diagram of the step 5 in the image contrast enhancement method according to the present invention.

As known according to the formula of the second gray scale value weight k2, The second gray scale value weight k2 is inversely proportional to n root mean square of the absolute value Q2 of the difference of gray scale values of pixels of two adjacent columns in the same row.

performing cumulative calculation according to the second gray scale value weight k2 and the gray scale values of pixels of two adjacent columns in each same row, and a formula is:

$$C3(X) = \Sigma_{a=Gray(i,j)}^{Gray(i,j+1)} k2 H3(a)$$

wherein i, j are positive integers, which respectively represents a row number and a column number where the pixel is, and Gray(i,j) is a gray scale value of the pixel of ith row, jth column, and Gray(i,j+1) is a gray scale value of the pixel of ith row, j+1th column, and H3(a) is an amount of the pixels, of which gray scale values are a, and C3(X) is a sum amount of the pixels corresponded with respective gray scale values between Gray(i,j) and Gray(i,j+1); X is a positive integer between 0 and 255.

step 4, as shown in FIG. 9, adding the C1(X) in the step 2 and the C3(X) in the step 3 to obtain C(X), i.e. $C(X) = C1(X) + C3(X)$.

step 5, maximum normalization as shown in FIG. 10, and a formula is:

$$N(X) = (\Sigma_{a=0}^{255} C(a))/C(255)$$

and multiplying N(X) by 255 to obtain an enhancement gray scale table out(X) with calculation, and looking up the table to obtain a new output gray scale value out_gray(i,j).

Figure 11:
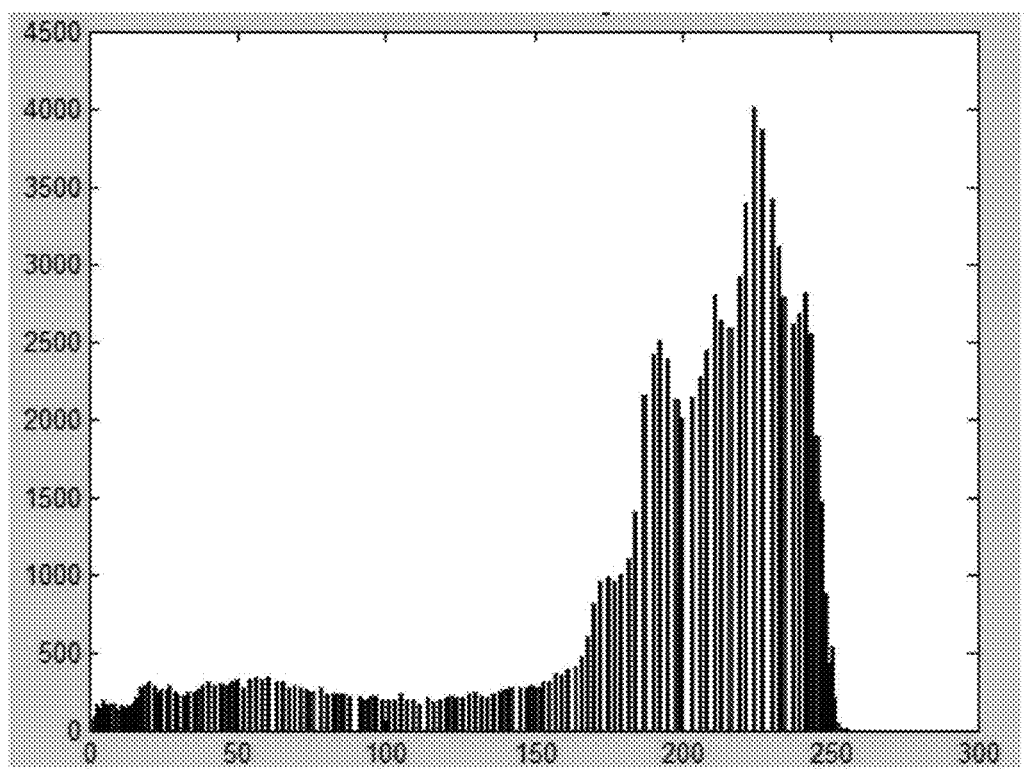
FIG. 11 is a histogram diagram of the image, in which the contrast is enhanced with the Global Histogram Equalization method according to the present invention.
Figure 12:
FIG. 12 is a display effect diagram of the image, in which the contrast is enhanced with the Global Histogram Equalization method according to the present invention.

Please refer to FIG. 11 and FIG. 12 at the same time. After the contrast of the image is enhanced with the image contrast enhancement method according to the present invention, the gray scale distribution of the image is more uniform. The contrast of the image is greatly raised in comparison with prior art, and the distortion of the image is reduced to optimize the display result.

In conclusion, the image contrast enhancement method of the present invention respectively calculates the absolute values of the differences of the gray scales between the pixels of two adjacent row of the same column and between the pixels of two adjacent column of the same row, and respectively calculates the first gray scale value weight and the second gray scale value weight according to the absolute values. Then, the cumulative calculation and the normalization process are performed according to the first, the second gray scale value weights. Ultimately, the enhancement gray scale table is obtained for redistributing the gray scale values of the respective pixels, which can raise the contrast of the image, reduce the distortion of the image and optimize the display result.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. An image contrast enhancement method, comprising steps of:

step 1, providing an image comprising a plurality of pixels aligned in an array, and converting the image into a gray scale image;

step 2, calculating an absolute value Q1 of a difference of gray scale values of pixels of two adjacent rows in each same column and a first gray scale value weight k1;

a formula of the absolute value Q1 of the difference of gray scale values of pixels of two adjacent rows in each same column is:

$$Q1 = abs(Gray(i,j) - Gray(i+1,j))$$

a formula of the first gray scale value weight k1 is:

$$k1 = \frac{\sqrt[n]{256}}{\sqrt[n]{Q1}}$$

wherein a value range of the absolute value Q1 of the difference of gray scale values of pixels of two adjacent rows in the same column is 0 to 255, and n is a positive integer larger than 1;

performing a first cumulative calculation according to the first gray scale value weight k1 and the gray scale values of pixels of two adjacent rows in each same column;

a formula of the first cumulative calculation is:

$$C1(X) = \Sigma_{a=Gray(i,j)}^{Gray(i+1,j)} k1 H1(a)$$

wherein i, j are positive integers, which respectively represent a row number and a column number where the pixel is, and Gray(i,j) is a gray scale value of the pixel of an ith row, jth column, and Gray(i+1,j) is a gray scale value of the pixel of an i+1th row, jth column, and H1 (a) is an amount of the pixels, of which gray scale values are a, and C1(X) is a sum amount of the pixels corresponded with respective gray scale values between Gray(i,j) and Gray(i+1,j);

step 3, calculating an absolute value Q2 of a difference of gray scale values of pixels of two adjacent columns in each same row and a second gray scale value weight k2;

a formula of the absolute value Q2 of the difference of gray scale values of pixels of two adjacent columns in each same row is:

$Q2=\text{abs}(\text{Gray}(i,j)-\text{Gray}(i,j+1))$ a formula of the second gray scale value weight k2 is:

$$k2 = \frac{\sqrt[n]{256}}{\sqrt[n]{Q2}}$$

wherein a value range of the absolute value Q2 of the difference of gray scale values of pixels of two adjacent columns in the same row is 0 to 255, and n is a positive integer larger than 1 and is the same value in step 2;

performing a second cumulative calculation according to the second gray scale value weight k2 and the gray scale values of pixels of two adjacent columns in each same row;

a formula of the second cumulative calculation is:

$$C3(X) = \Sigma_{a=\text{Gray}(i,j)}^{\text{Gray}(i,j+1)} k2 H3(a)$$

wherein i, j are positive integers, which respectively represent a row number and a column number where the pixel is, and Gray(i,j) is a gray scale value of the pixel of an ith row, jth column, and Gray(i,j+1) is a gray scale value of the pixel of an ith row, j+1 th column, and H3(a) is an amount of the pixels, of which gray scale values are a, and C3(X) is a sum amount of the pixels corresponded with respective gray scale values between Gray(i,j) and Gray(i,j+1);

step 4, adding the C1(X) in the step 2 and the C3(X) in the step 3 to obtain C(X);

$$C(X) = C1(X) + C3(X)$$

step 5, performing maximum normalization;

a formula of the maximum normalization is:

$$N(X) = (\Sigma_{a=0}^{255} C(a))/C(255)$$

and multiplying N(X) by 255 to obtain an enhancement gray scale table out(X), and looking up the enhancement gray scale table out(X) to obtain a new output gray scale value out_gray(i,j).

2. The image contrast enhancement method according to claim 1, wherein the each pixel comprises: a red sub pixel, a green sub pixel and a blue sub pixel.

3. The image contrast enhancement method according to claim 2, wherein a conversion formula of converting the image to the gray scale image is:

$$\text{Gray}(i,j) = (R(i,j)+G(i,j)+B(i,j))/3$$

wherein R(i,j), G(i,j) and B(i,j) respectively are gray scale values corresponding to the red sub pixel, the green sub pixel and the blue sub pixel of the pixel of ith row, jth column.

4. The image contrast enhancement method according to claim 1, wherein X is a positive integer between 0 and 255.

5. The image contrast enhancement method according to claim 1, wherein the first gray scale value weight k1 and the second gray scale value weight k2 are the same or different.

6. The image contrast enhancement method according to claim 1, wherein the image in the step 1 is an image shown by a flat display apparatus.

7. The image contrast enhancement method according to claim 1, wherein n in the step 2 and the step 3 is 2, 3 or 4.

8. The image contrast enhancement method according to claim 1, wherein the first gray scale value weight k1 is inversely proportional to n root mean square of the absolute value Q1 of the difference of gray scale values of pixels of two adjacent rows in the same column, and the second gray scale value weight k2 is inversely proportional to n root mean square of the absolute value Q2 of the difference of gray scale values of pixels of two adjacent columns in the same row.

9. An image contrast enhancement method, comprising steps of:

step 1, providing an image comprising a plurality of pixels aligned in an array, and converting the image into a gray scale image;

step 2, calculating an absolute value Q1 of a difference of gray scale values of pixels of two adjacent rows in each same column and a first gray scale value weight k1;

a formula of the absolute value Q1 of the difference of gray scale values of pixels of two adjacent rows in each same column is:

$Q1=\text{abs}(\text{Gray}(i,j)-\text{Gray}(i+1,j))$ a formula of the first gray scale value weight k1 is:

$$k1 = \frac{\sqrt[n]{256}}{\sqrt[n]{Q1}}$$

wherein a value range of the absolute value Q1 of the difference of gray scale values of pixels of two adjacent rows in the same column is 0 to 255, and n is a positive integer larger than 1;

performing a first cumulative calculation according to the first gray scale value weight k1 and the gray scale values of pixels of two adjacent rows in each same column;

a formula of the first cumulative calculation is:

$$C1(X) = \Sigma_{a=\text{Gray}(i,j)}^{\text{Gray}(i+1,j)} k1 H1(a)$$

wherein i, j are positive integers, which respectively represents a row number and a column number where the pixel is, and Gray(i,j) is a gray scale value of the pixel of an ith row, jth column, and Gray(i+1,j) is a gray scale value of the pixel of an i+1th row, jth column, and H1(a) is an amount of the pixels, of which gray scale values are a, and C1(X) is a sum amount of the pixels corresponded with respective gray scale values between Gray(i,j) and Gray(i+1,j);

step 3, calculating an absolute value Q2 of a difference of gray scale values of pixels of two adjacent columns in each same row and a second gray scale value weight k2;

a formula of the absolute value Q2 of the difference of gray scale values of pixels of two adjacent columns in each same row is:

$Q2=\text{abs}(\text{Gray}(i,j)-\text{Gray}(i,j+1))$ a formula of the second gray scale value weight k2 is:

$$k2 = \frac{\sqrt[n]{256}}{\sqrt[n]{Q2}}$$

wherein a value range of the absolute value Q2 of the difference of gray scale values of pixels of two adjacent columns in the same row is 0 to 255, and n is a positive integer larger than 1 and is the same value in step 2;

performing a second cumulative calculation according to the second gray scale value weight k2 and the gray scale values of pixels of two adjacent columns in each same row;

a formula of the second cumulative calculation is:

$$C3(X) = \Sigma_{a=Gray(i,j)}^{Gray(i,j+1)} k2 H3(a)$$

wherein i, j are positive integers, which respectively represents a row number and a column number where the pixel is, and Gray(i,j) is a gray scale value of the pixel of an ith row, jth column, and Gray(i,j+1) is a gray scale value of the pixel of an ith row, j+1 th column, and H3(a) is an amount of the pixels, of which gray scale values are a, and C3(X) is a sum amount of the pixels corresponded with respective gray scale values between Gray(i,j) and Gray(i,j+1);

step 4, adding the C1(X) in the step 2 and the C3(X) in the step 3 to obtain C(X);

$$C(X) = C1(X) + C3(X)$$

step 5, performing maximum normalization;
a formula of the maximum normalization is:

$$N(X) = (\Sigma_{z=0}^{255} C(a))/C(255)$$

and multiplying N(X) by 255 to obtain an enhancement gray scale table out(X), and looking up the enhancement gray scale table out(X) to obtain a new output gray scale value out_gray(i,j);

wherein the each pixel comprises: a red sub pixel, a green sub pixel and a blue sub pixel;

wherein the image in the step 1 is an image shown by a flat display apparatus;

wherein n in the step 2 and the step 3 is 2, 3 or 4.

10. The image contrast enhancement method according to claim 9, wherein a conversion formula of converting the image to the gray scale image is:

$$Gray(i,j) = (R(i,j) + G(i,j) + B(i,j))/3$$

wherein R(i,j), G(i,j) and B(i,j) respectively are gray scale values corresponding to the red sub pixel, the green sub pixel and the blue sub pixel of the pixel of ith row, jth column.

11. The image contrast enhancement method according to claim 9, wherein X is a positive integer between 0 and 255.

12. The image contrast enhancement method according to claim 9, wherein the first gray scale value weight k1 and the second gray scale value weight k2 are the same or different.

13. The image contrast enhancement method according to claim 9, wherein the first gray scale value weight k1 is inversely proportional to n root mean square of the absolute value Q1 of the difference of gray scale values of pixels of two adjacent rows in the same column, and the second gray scale value weight k2 is inversely proportional to n root mean square of the absolute value Q2 of the difference of gray scale values of pixels of two adjacent columns in the same row.

* * * * *